(12) United States Patent
Xing et al.

(10) Patent No.: US 11,218,571 B2
(45) Date of Patent: Jan. 4, 2022

(54) METHODS AND STORAGE MEDIA FOR TRANSMITTING MESSAGE

(71) Applicant: BEIJING BAIDU NETCOM SCIENCE AND TECHNOLOGY CO., LTD., Beijing (CN)

(72) Inventors: Yue Xing, Beijing (CN); Derun Zhao, Beijing (CN); Ting Wang, Beijing (CN); Yang Zhan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/866,469

(22) Filed: May 4, 2020

(65) Prior Publication Data
US 2020/0366766 A1    Nov. 19, 2020

(30) Foreign Application Priority Data
May 17, 2019    (CN) .......................... 201910412914.1

(51) Int. Cl.
*H04L 29/06*    (2006.01)
*H04L 1/18*    (2006.01)
(Continued)

(52) U.S. Cl.
CPC .......... *H04L 69/163* (2013.01); *H04L 1/1809* (2013.01); *H04L 47/193* (2013.01); *H04W 36/02* (2013.01)

(58) Field of Classification Search
CPC ................. H04L 1/1671; H04L 1/1678; H04L 1/1829–1896; H04L 67/28
See application file for complete search history.

(56) References Cited

U.S. PATENT DOCUMENTS

2004/0030982 A1* 2/2004 Aldridge ............. H04L 63/0428
714/776
2012/0136741 A1    5/2012 Agarwal
(Continued)

FOREIGN PATENT DOCUMENTS

CN    101184055 A    5/2008
CN    102137031 A    7/2011
(Continued)

OTHER PUBLICATIONS

Chinese Patent Application No. 201910412914.1 First Office Action dated May 19, 2020, 10 pages.
(Continued)

*Primary Examiner* — Pao Sinkantarakorn
(74) *Attorney, Agent, or Firm* — Lathrop GPM LLP

(57) ABSTRACT

The present disclosure provides a method and a storage medium for transmitting a message. The method includes: sending a current message transmission packet to an output device, the current message transmission packet including current message data and transmission progress information; obtaining an acknowledgement packet from the output device; and sending transmission progress information in the acknowledgement packet to a persistent storage system, such that the persistent storage system stores the transmission progress information in the acknowledgement packet as input progress information of the current message data.

11 Claims, 5 Drawing Sheets sending a current message transmission packet to an output device based on current message data obtained from a message provider, the current message transmission packet comprising the current message data and transmission progress information — S110 when a streaming transmission system is in a normal transmission state, obtaining an acknowledgement packet fed back after the output device sends the current message data to a message storage device — S120 sending the transmission progress information in the acknowledgement packet to a persistent storage system, such that the persistent storage system stores the transmission progress information as input progress information of the current message data — S130

(51) Int. Cl.
*H04L 12/801* (2013.01)
*H04W 36/02* (2009.01)

(56) References Cited

U.S. PATENT DOCUMENTS

| | | | | |
|---|---|---|---|---|
| 2012/0218914 A1* | 8/2012 | Tanaka | .................... | H04L 47/34 |
| | | | | 370/253 |
| 2013/0128757 A1* | 5/2013 | Chowdhary | .......... | H04W 24/00 |
| | | | | 370/252 |
| 2016/0212032 A1* | 7/2016 | Tsuruoka | .............. | H04L 43/106 |

FOREIGN PATENT DOCUMENTS

| | | |
|---|---|---|
| CN | 103227812 A | 7/2013 |
| CN | 105227610 A | 1/2016 |
| CN | 106534255 A | 3/2017 |
| CN | 106657332 A | 5/2017 |

OTHER PUBLICATIONS

Chinese Patent Application No. 201910412914.1 English translation of First Office Action dated May 19, 2020, 11 pages.

* cited by examiner

METHODS AND STORAGE MEDIA FOR TRANSMITTING MESSAGE

CROSS-REFERENCE TO RELATED APPLICATION

This application claims priority to and benefits of Chinese Patent Application No. 201910412914.1, filed on May 17, 2019, the entire content of which is incorporated herein by reference for all purposes.

FIELD

The present disclosure relates to a field of data processing technologies, and more particularly to a method, an apparatus, a device, and a storage medium for transmitting a message.

BACKGROUND

In a distributed data transmission system, an occasional error (such as a machine failure, a system update, and a strong dependency jitter) may lead to the system to restart. Presently, based on an ETL (Extract-Transform-Load) mechanism, transactional persistence is performed on message data of each message and a water level of a subscription progress system in a streaming transmission system of each message, thereby guaranteeing a strong consistency. In this way, the message data is stored in the streaming transmission system, a streaming system and a file system, thereby wasting resources. Meanwhile, since the data is backed up, a data transmission rate is caused to be lower.

SUMMARY

In a first aspect, the present disclosure provides a method for transmitting a message, which is executable by an input device. The method includes: sending a current message transmission packet to an output device, the current message transmission packet including current message data and transmission progress information; obtaining an acknowledgement packet from the output device; and sending transmission progress information in the acknowledgement packet to a persistent storage system, such that the persistent storage system stores the transmission progress information in the acknowledgement packet as input progress information of the current message data.

In a second aspect, the present disclosure provides a method for transmitting a message, which is executable by an output device. The method includes: when a streaming transmission system is in a normal transmission state, receiving a current message transmission packet from an input device, the current message transmission packet including current message data and transmission progress information; and feeding back an acknowledgement packet to the input device after sending the current message data to a message storage device, such that the input device sends the transmission progress information in the acknowledgement packet to a persistent storage system.

In a third aspect, embodiments of the present disclosure provide a storage medium having a computer program stored thereon. When the computer program is executed by a processor, the processor is caused to implement the method for transmitting a message according to any one of embodiments of the present disclosure.

The above is merely a summary for technical solutions of the present disclosure. In order to better understand the technical solutions of the present disclosure, the technical solutions may be implemented according to content of the specification. In order to make the above and other objectives, features and advantages of the present disclosure more obvious and understandable, the following is a detailed implementation of the present disclosure.

BRIEF DESCRIPTION OF THE DRAWINGS

Other features, objectives and advantages of the present disclosure will become more apparent upon reading a detailed description of non-limiting embodiments made with reference to the following accompanying drawings. The accompanying drawings are for the purpose of illustrating a preferred embodiment only and are not to be considered to limit the present disclosure. Moreover, the same reference numeral is used to refer to the same component throughout the accompanying drawings. In the accompanying drawings.

DETAILED DESCRIPTION

Detailed description will be further made in the following to the present disclosure with reference to the accompanying drawings and the embodiments. It should be understood that, detailed embodiments described herein are intended only to explain the present disclosure, and are not intended to limit the present disclosure. In addition, it should be also noted that, for the convenience of description, only some contents but not all of the contents related to the present disclosure are illustrated in the accompanying drawings.

Before describing the exemplary embodiments in more detail, it should be mentioned that some exemplary embodiments are described as processes or methods depicted by flow charts. Although the flow chart describes various operations (or steps) as a sequential process, a plurality of operations may be implemented in parallel, concurrently, or simultaneously. In addition, the sequence of various operations may be rearranged. The process may be terminated when the operations for the process are completed, but may also have additional steps not included in the accompanying drawings. The process may correspond to a method, a function, a procedure, a subroutine, a subprogram, etc.

Figure 1:
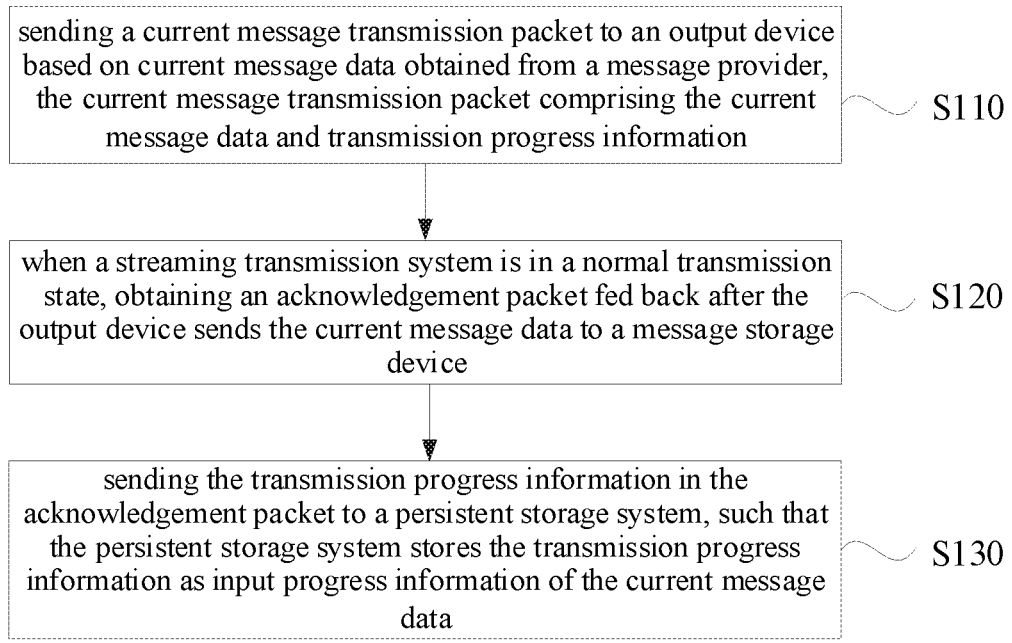
FIG. 1 is a flow chart illustrating a method for transmitting a message according to embodiments of the present disclosure.

FIG. 1 is a flow chart illustrating a method for transmitting a message according to embodiments of the present disclosure. This embodiment may be applied to a condition where transmitting the message data is performed in a distributed data transmission system. The method may be executed by an apparatus for transmitting a message. The apparatus may be implemented in form of software and/or hardware, and integrated in any input device having a network communication function. As illustrated in FIG. 1, the method for transmitting the message according to embodiments of the present disclosure includes the following.

At block S110, a current message transmission packet is sent to an output device based on current message data obtained from a message provider. The current message transmission packet includes the current message data and transmission progress information.

Generally, in the distributed data transmission system, the message data of the message provider may be transmitted to a message storage device normally. However, in an actual application, an accidental error such as a machine failure, a code change and a strong dependence jitter may cause the system to restart, thereby causing that the message data may not be transmitted normally. In order to ensure that an affected operator may recover quickly from an interruption state or in order to reduce a workload after restarting, after the above condition occurs, there is a need to improve a transmission mode for the message data in a streaming transmission system.

Figure 2:
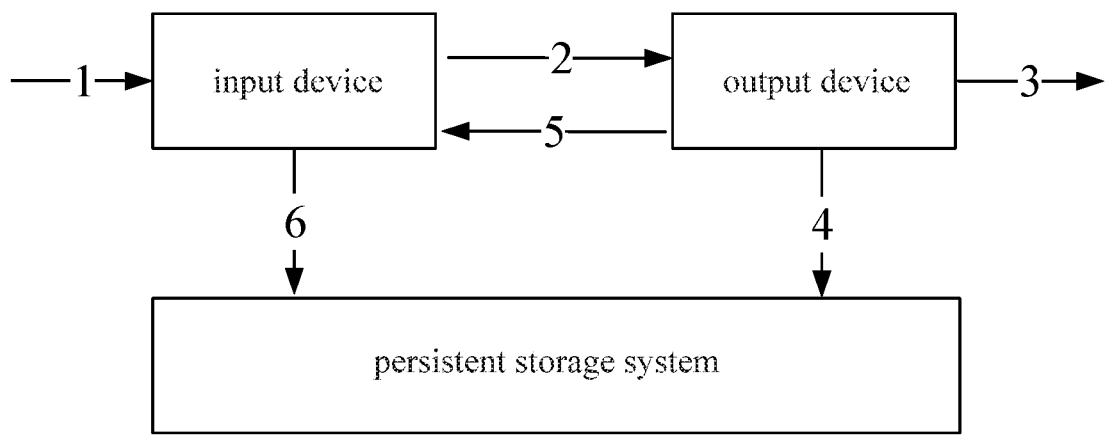
FIG. 2 is a schematic diagram illustrating a method for transmitting a message according to embodiments of the present disclosure.

In this embodiment, FIG. 2 is a schematic diagram illustrating a method for transmitting a message according to embodiments of the present disclosure. Referring to FIG. 2, the streaming transmission system includes a plurality of streaming partitions. Each streaming partition may include an input device and an output device. The input device and the output device in the same streaming partition correspond to the same message transmission process. Therefore, the streaming transmission system includes a plurality of input devices and output devices. The message provider may or may not be a data source, as long as the message data may be provided to the message storage device. In addition, a persistent storage system is a storage system independent of the streaming transmission system. The persistent storage system may be a transactional persistent storage system, to ensure that all transmission tasks of a plurality of messages are executed or not executed when there is atomicity among the transmission tasks of the plurality of messages in a transaction submitted.

In this embodiment, taking a transmission process of the message data as an example for exemplary description, referring to FIG. 2, in a flow 1 of a message transmission, the input device in the streaming transmission system may receive current message data subscribed from the message provider. After obtaining the current message data through subscribing, the input device may generate a current message transmission packet correspondingly according to the obtained current message data, and ensure that the current message transmission packet includes the current message data and transmission progress information of the current message data. In a flow 2 of the message transmission, the input device of the streaming transmission system may send the current message transmission packet generated by the input device to the output device of the streaming transmission system, such that the output device may obtain the current message data in the current message transmission packet and transmit the obtained current message data to the message storage device.

In an alternative implementation of this embodiment, the transmission progress information includes a global system message-transmission progress and position information of the current message data in the message provider.

In this embodiment, the position information of the current message data in the message provider refers to a position of an ID of the current message data in the message provider. The position of the ID of the current message data in the message provider is a message start point of the message data transmission at this time. The global system message-transmission progress is configured to represent a transmission completing progress of the current message data in the streaming transmission system. For example, both the input device and the output device of the streaming transmission system have a plurality of transmission partitions, and each transmission partition has a completing writing time. For example, when times of most transmission partitions are 10:00, and a time of a certain transmission partition is 9:50, the global system message-transmission progress of this transmission partition is recorded as 9:50, and the data before this 9:50 has been completed.

At block S120, when a streaming transmission system is in a normal transmission state, an acknowledgement packet that is fed back after the output device sends the current message data to a message storage device, is obtained.

In this embodiment, referring to FIG. 2, in the streaming transmission system, the output device may normally receive the current message transmission packet sent by the input device, and obtain the current message data and the transmission progress information included in the obtained current message transmission packet. When the streaming transmission system is in the normal transmission state, the output device may transmit the obtained current message data to the message storage device in a flow 3 of the message transmission. In the streaming transmission system, after the output device may transmit the obtained current message data to the message storage device normally, referring to a flow 5 of the message transmission, the output device may feed back the acknowledgement packet to the input device. The acknowledgement packet includes the transmission progress information of the current message data. The input device may receive the acknowledgement packet sent by the output device. Alternatively, the transmission progress information includes the global system message-transmission progress and the position information of the current message data in the message provider.

At block S130, the transmission progress information in the acknowledgement packet is sent to a persistent storage system, such that the persistent storage system stores the transmission progress information as input progress information of the current message data.

In this embodiment, referring to FIG. 2, after obtaining the acknowledgement packet fed back after the output device sends the current message data to the message storage device, the input device may send the obtained acknowledgement packet to the persistent storage system. In detail, referring to a flow 6 of the message transmission, the input device may send the transmission progress information included in the acknowledgement packet to the persistent storage system. The persistent storage system may store the transmission progress information in the acknowledgement packet, sent by the input device, and take the transmission progress information as the input progress information of the current message data. In the above way, during transmitting the current message data, persistence processing may be performed on the input progress of the current message data according to an output result of the current message data, such that there is no need to perform persistence processing on the current message data. Since there is no need to perform persistence processing on the current message data, the time and the resource cost caused by performing persistence processing on the current message data may be avoided, and the amount of persisted data may be minimized.

On the basis of the above embodiment, alternatively, after sending the transmission progress information in the acknowledgement packet to the persistent storage system, the method further includes: when detecting that the persistent storage system stores the input progress information of the current message data, generating a removing duplication instruction for the current message data, and sending the removing duplication instruction to the message provider, to indicate the message provider to delete the current message data.

In this embodiment, when the persistent storage system stores the input progress information of the current message data, it indicates that the output device already sends the current message data to the message storage device, and the current message data at the message provider is duplicated with the current message data sent to the message storage device. For this, the input device may detect whether the persistent storage system stores the input progress information of the current message data. When it is detected that the persistent storage system stores the input progress information of the current message data, the removing duplication instruction for the current message data is generated, and the generated removing duplication instruction is sent to the message provider, to indicate the message provider to delete the current message data included in the message provider.

With the solution for transmitting the message according to embodiments of the present disclosure, the input device of the message transmission system may obtain the message data from the message provider and send the message data to the output device, and the output device feeds back the acknowledgement packet to the input device after sending the message data to the message storage device. During transmitting the message data, persistence processing is performed on the input progress of the message data based on the output result of the message data, thus there is no need to perform persistence processing on the message data. Meanwhile, the consistency of the message data and the system transmission progress may be ensured by performing persistence processing on the input progress of the message data, thereby avoiding problems such as message loss and message duplication caused by the system abnormality, and improving the message transmission efficiency.

Figure 3:
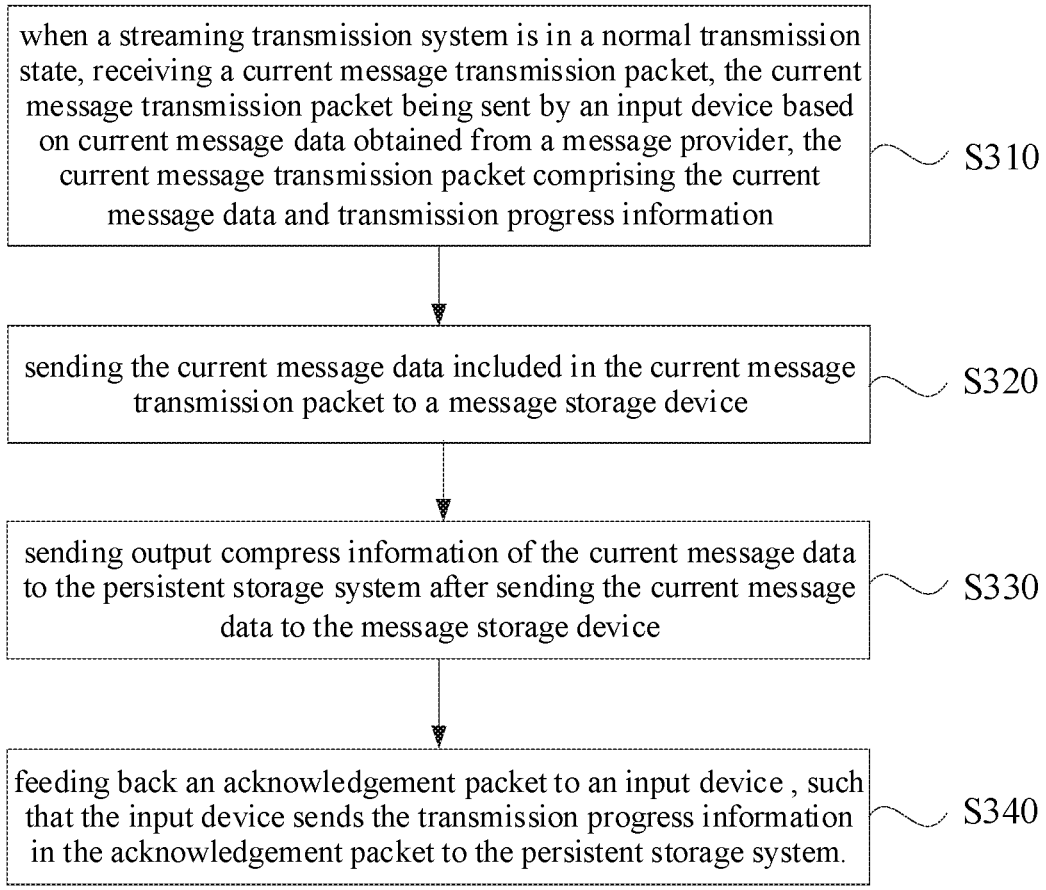
FIG. 3 is a flow chart illustrating a method for transmitting a message according to embodiments of the present disclosure.

FIG. 3 is a flow chart illustrating a method for transmitting a message according to embodiments of the present disclosure. This embodiment may be applied to a condition where transmitting the message data is performed in a distributed data transmission system. The method may be executed by an apparatus for transmitting a message. The apparatus may be implemented in form of software and/or hardware, and integrated in any output device having a network communication function. As illustrated in FIG. 3, the method for transmitting the message according to embodiments of the present disclosure includes the following.

At block S310, when a streaming transmission system is in a normal transmission state, a current message transmission packet is received. The current message transmission packet is sent by an input device based on current message data obtained from a message provider. The current message transmission packet includes the current message data and transmission progress information.

In this embodiment, referring to FIG. 2, in the streaming transmission system, the input device may generate the current message transmission packet according to the current message data obtained from the message provider, and transmit the generated current message transmission packet to the output device. When the streaming transmission system is in the normal transmission state, the output device may receive the current message transmission packet sent by the input device normally. The current message transmission packet includes the current message data and the transmission progress information. Alternatively, the transmission progress information includes a global system message-transmission progress and position information of the current message data in the message provider.

At block S320, the current message data included in the current message transmission packet is sent to a message storage device.

In this embodiment, the output device may obtain the current message data included in the current message transmission packet, and transmit the current message data in the current message transmission packet to the message storage device for processing when the streaming transmission system is in the normal transmission state.

At block S330, output compress information of the current message data is sent to a persistent storage system after the current message data is sent to the message storage device.

In this embodiment, after sending the current message data to the message storage device normally, the output device may send the output compress information of the current message data to the persistent storage system, and the output compress information of the current message data is stored in the persistent storage system. The output compress information of the current message data is configured to indicate that the current message data is transmitted to a file system corresponding to the message storage device, and the current message data is concreted in a concrete writing position of the file system. In the above way, during transmitting the current message data, persistence processing may be performed on the output progress of the current message data according to an output result of the current message data, such that there is no need to perform persistence processing on the current message data. Since there is no need to perform persistence processing on the current message data, the time and the resource cost caused by performing persistence processing on the current message data may be avoided, and the amount of persisted data may be minimized.

At block S340, an acknowledgement packet is fed back to the input device, such that the input device sends the transmission progress information in the acknowledgement packet to the persistent storage system.

In this embodiment, after the output progress information of the current message data is sent and stored in the persistent storage system, the output device may send the acknowledgement packet to the input device, such that the input device may send the transmission progress information in the acknowledgement packet to the persistent storage system for storing after receiving the acknowledgement packet. The acknowledgement packet includes the transmission progress information of the current message data.

Figure 4:
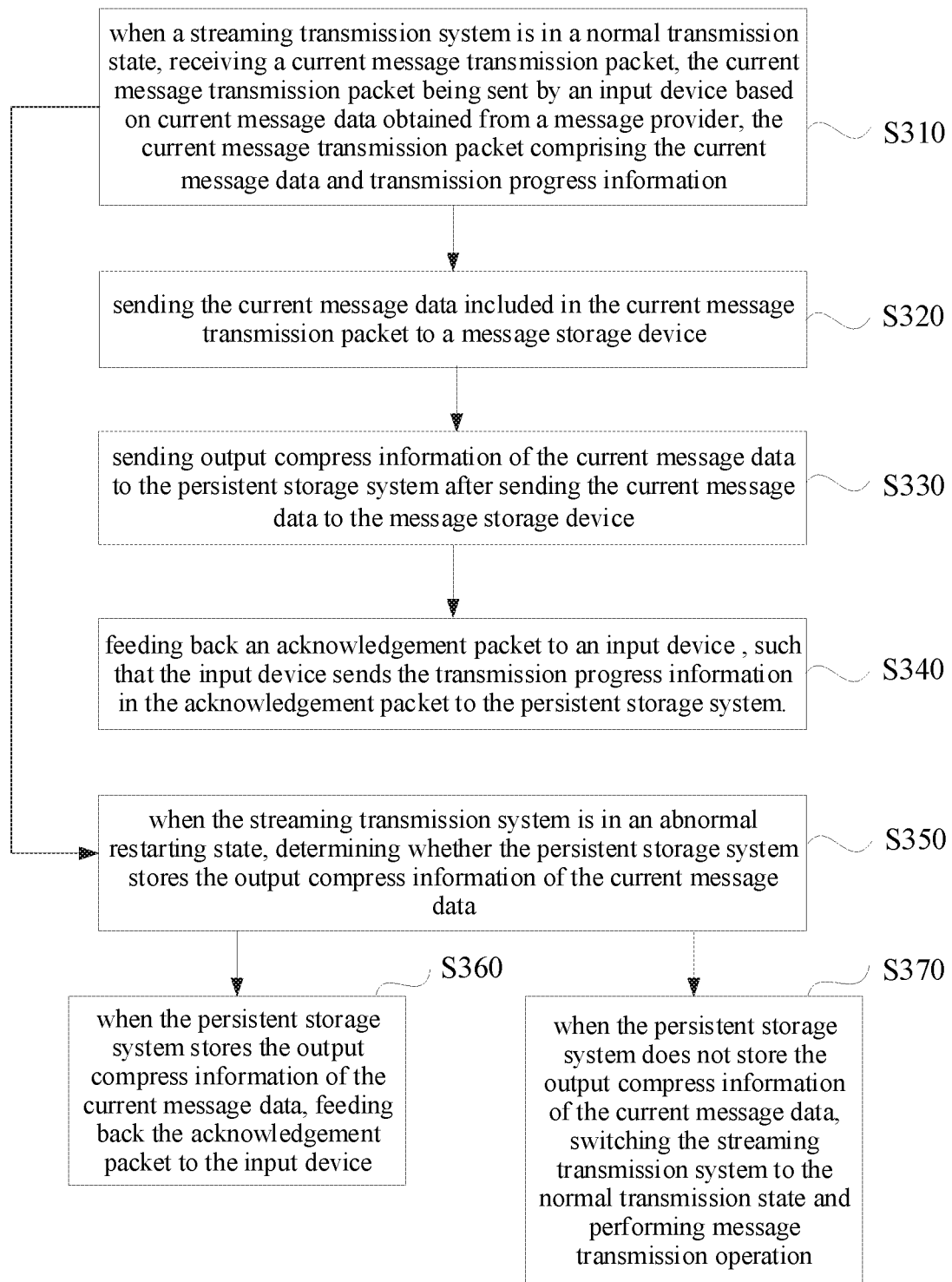
FIG. 4 is a flow chart illustrating a method for transmitting a message according to embodiments of the present disclosure.

On the basis of the above embodiments, alternatively, the method for transmitting the message according to embodiments of the present disclosure may also include actions at blocks S350-S370 which are not illustrated in FIG. 4.

FIG. 4 is a flow chart illustrating a method for transmitting a message according to embodiments of the present disclosure.

At block S310, when a streaming transmission system is in a normal transmission state, a current message transmission packet is received. The current message transmission packet is sent by an input device based on current message data obtained from a message provider. The current message transmission packet includes the current message data and transmission progress information.

At block S320, the current message data included in the current message transmission packet is sent to a message storage device.

At block S330, output compress information of the current message data is sent to a persistent storage system after the current message data is sent to the message storage device.

At block S340, an acknowledgement packet is fed back to the input device, such that the input device sends the transmission progress information in the acknowledgement packet to the persistent storage system.

At block S350, when the streaming transmission system is in an abnormal restarting state, after any current message transmission packet sent by the input device is received, it is determined whether the persistent storage system stores the output compress information of the current message data.

In this embodiment, referring to FIG. 2, when the streaming transmission system is abnormal, the message transmission from the input device to the output device may be interrupted, thus a normal transmission operation for the current message data may not be performed. When the streaming transmission system is in an abnormal restarting state, that is, the streaming transmission system is transformed from an abnormal interrupted state to a system restarting state, in order to quickly resume the interrupted message transmission, and as far as possible to avoid a huge workload brought by performing data transmission again after the streaming transmission system is restarted, the output device may detect whether the persistent storage system stores the output compress information of the current message data after the input device sends any message transmission packet to the output device.

At block S360, when the persistent storage system stores the output compress information of the current message data, the acknowledgement packet is fed back to the input device, such that the input device indicates the message provider to perform removing duplication on the current message data based on the acknowledgement packet for the current message data.

In this embodiment, when the persistent storage system stores the output compress information of the current message data, it indicates that the output device already sends the current message data included in the message transmission packet to the message storage device before the streaming transmission system is in the abnormal restarting state. In this condition, there is no need to send the current message data downstream. Meanwhile, since the output device sends the current message data to the message storage device already, the input device needs to delete the same current message data in the message storage device correspondingly, to ensure data consistency. In detail, the output device may feed back the acknowledgement packet for the current message data to the input device, such that the input device indicates the message provider to perform removing duplication processing on the current message data according to the acknowledgement packet of the current message data, and duplication of the current message data in the message storage device and the message provider may be avoided.

At block S370, when the persistent storage system does not store the output compress information of the current message data, the streaming transmission system is switched to the normal transmission state and message transmission operation is performed.

In this embodiment, when it is detected that the persistent storage system does not store the output compress information of the current message data, it indicates that the output device does not send the current message data to the message storage device before the streaming transmission system restarts abnormally. In this condition, the message storage device does not store the current message data, and the current message data is only stored in the message provider, that is, the current message data in the message provider is not duplicated with the current message data in the message storage device. In this condition, the streaming transmission system may be switched to the normal transmission state, and the message transmission operation is performed, such that the input device receives the current message data sent by the message provider, the current message data is sent to the message storage device by the output device, and the input compress and the output progress of the current message data are stored in the persistent storage system.

With the solution for transmitting the message according to embodiments of the present disclosure, the input device of the streaming transmission system may obtain the message data from the message provider and send the message data to the output device, and the output device feeds back the acknowledgement packet to the input device after sending the message data to the message storage device. During transmitting the message data, persistence processing is performed on the output progress of the message data based on the output result of the message data, thus there is no need to perform persistence processing on the message data. Meanwhile, the consistency of the message data and the system transmission progress may be ensured by performing persistence processing on the output progress of the current message data, thereby reducing problems such as message loss and message duplication caused by the system abnormality, and improving the message transmission efficiency.

Figure 5:
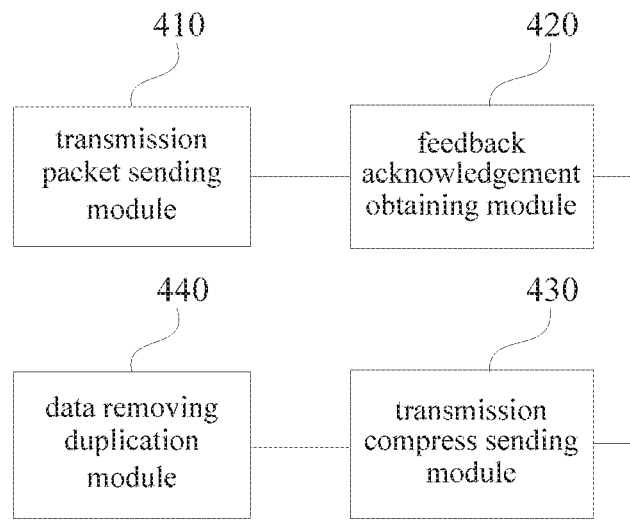
FIG. 5 is a block diagram illustrating an apparatus for transmitting a message according to embodiments of the present disclosure.

FIG. 5 is a block diagram illustrating an apparatus for transmitting a message according to embodiments of the present disclosure. This embodiment may be applied to message data transmission in a distributed data transmission system. The apparatus may be implemented in form of software and/or hardware, and integrated in any input device having a network communication function. As illustrated in FIG. 5, the apparatus for transmitting the message according to embodiments of the present disclosure may include: a transmission packet sending module 410, a feedback acknowledgement obtaining module 420, and a transmission compress sending module 430.

The transmission packet sending module 410 is configured to send a current message transmission packet to an output device based on current data obtained from a message provider. The current message transmission packet includes the current message data and transmission progress information.

The feedback acknowledgement obtaining module 420 is configured to, when a streaming transmission system is in a normal transmission state, obtain an acknowledgement packet fed back after the output device sends the current message data to a message storage device.

The transmission compress sending module 430 is configured to send the transmission progress information in the acknowledgement packet to a persistent storage system, such that the persistent storage system stores the transmission progress information as input progress information of the current message data.

On the basis of the above embodiment, alternatively, the apparatus further includes: a data removing duplication module 440. The data removing duplication module 440 is configured to: when detecting that the persistent storage system stores the input progress information of the current message data, generate a removing duplication instruction for the current message data, and send the removing duplication instruction to the message provider, to indicate the message provider to delete the current message data.

On the basis of the above embodiment, alternatively, the transmission progress information includes a global system message-transmission progress and position information of the current message data in the message provider.

The apparatus for transmitting the message according to embodiments of the present disclosure may execute the method for transmitting the message applied to the input device according to any one of embodiments of the present disclosure, and has a function and beneficial effect corresponding to executing the method for transmitting the message. Technical details not described in the above embodiment may refer to the method for transmitting the message according to any one of embodiments of the present disclosure.

Figure 6:
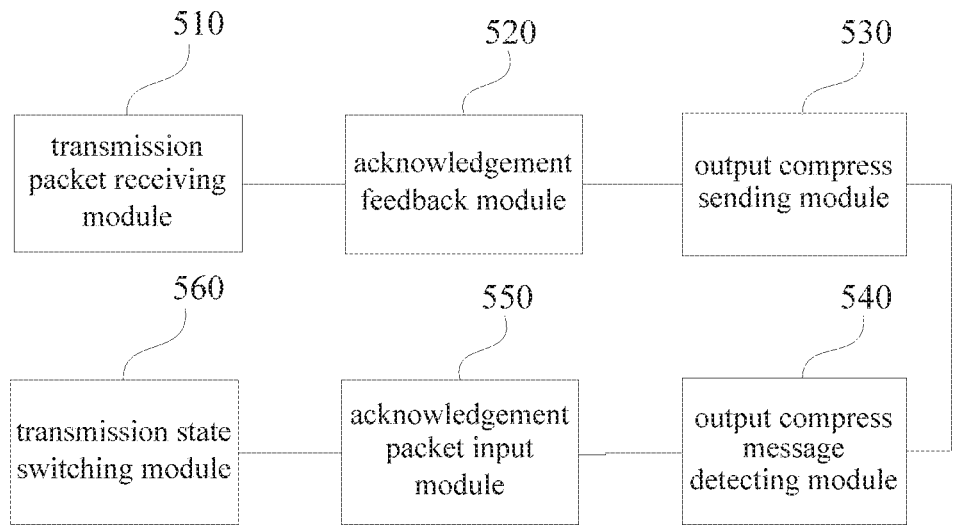
FIG. 6 is a block diagram illustrating an apparatus for transmitting a message according to embodiments of the present disclosure.

FIG. 6 is a block diagram illustrating an apparatus for transmitting a message according to another embodiment of the present disclosure. This embodiment may be applied to message data transmission in a distributed data transmission system. The apparatus may be implemented in form of software and/or hardware, and integrated in any output device having a network communication function. As illustrated in FIG. 6, the apparatus for transmitting the message according to embodiments of the present disclosure may include: a transmission packet receiving module 510 and an acknowledgement feedback module 520.

The transmission packet receiving module 510 is configured to, when a streaming transmission system is in a normal transmission state, receive a current message transmission packet sent by an input device based on current message data obtained from a message provider. The current message transmission packet includes the current message data and transmission progress information.

The acknowledgement feedback module 520 is configured to feed back an acknowledgement packet to the input device after sending the current message data to a message storage device, such that the input device sends the transmission progress information in the acknowledgement packet to a persistent storage system.

On the basis of the above embodiment, alternatively, the apparatus further includes: an output compress sending module 530. The output compress sending module 530 is configured to send output compress information of the current message data to the persistent storage system.

On the basis of the above embodiment, alternatively, the apparatus further includes: an output compress message detecting module 540, and an acknowledgement packet input module 550.

The output compress message detecting module 540 is configured to, when the streaming transmission system is in an abnormal restarting state, after receiving any current message transmission packet sent by the input device, determine whether the persistent storage system stores the output compress information of the current message data.

The acknowledgement packet input module 550 is configured to, when the persistent storage system stores the output compress information of the current message data, feed back the acknowledgement packet to the input device, such that the input device indicates the message provider to perform removing duplication on the current message data based on the acknowledgement packet for the current message data.

On the basis of the above embodiment, alternatively, the apparatus further includes: a transmission state switching module 560.

The transmission state switching module 560 is configured to switch the streaming transmission system to the normal transmission state and performs message transmission operation when the persistent storage system does not store the output compress information of the current message data.

On the basis of the above embodiment, alternatively, the transmission progress information includes a global system message-transmission progress and position information of the current message data in the message provider.

The apparatus for transmitting the message according to embodiments of the present disclosure may execute the method for transmitting the message applied to the output device according to any one of embodiments of the present disclosure, and has a function and beneficial effect corresponding to executing the method for transmitting the message. Technical details not described in the above embodiment may refer to the method for transmitting the message according to any one of embodiments of the present disclosure.

Figure 7:
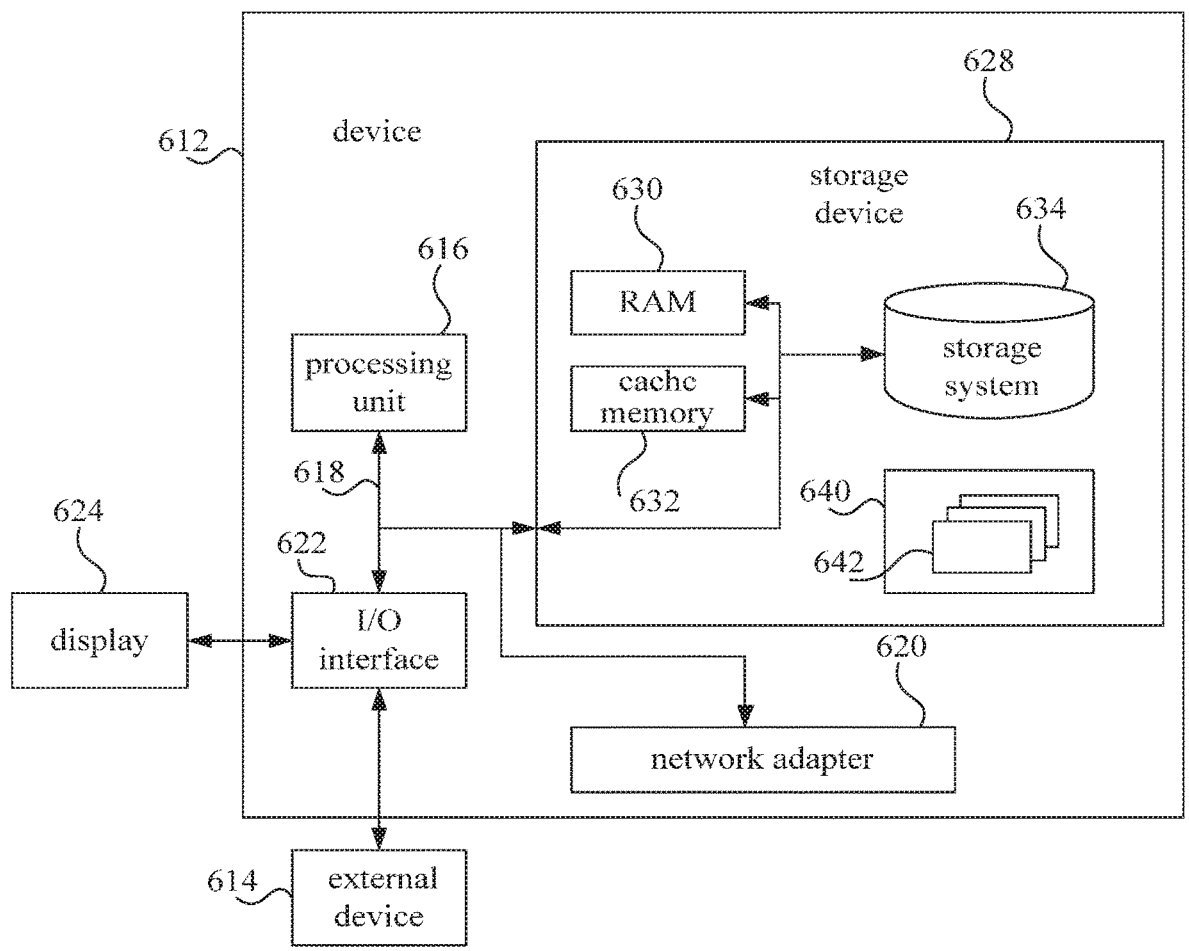
FIG. 7 is a block diagram illustrating a device according to embodiments of the present disclosure.

FIG. 7 is a block diagram illustrating a device according to embodiments of the present disclosure. FIG. 7 illustrates a block diagram of an exemplary device 612 applicable to implement implementations of the present disclosure. The device 612 illustrated in FIG. 7 is only an example, which may not bring any limitation to functions and application scope of embodiments of the present disclosure.

As illustrated in FIG. 7, the device 612 is embodied in the form of a general-purpose computing device. Components of the device 612 may include but not limited to: one or more processors or processing units 616, a system memory 628, and a bus 618 connecting different system components (including the system memory 628 and the processing unit 616).

The bus 618 represents one or more of several bus structures, including a storage bus or a storage controller, a peripheral bus, an accelerated graphics port, a processor, or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The device 612 typically includes a plurality of computer system readable mediums. These mediums may be any usable medium that may be accessed by the device 612, including volatile and non-volatile mediums, removable and non-removable mediums.

The system memory 628 may include computer system readable mediums in the form of volatile medium, such as a random-access memory (RAM) 630 and/or a cache memory 632. The device 612 may further include other removable/non-removable, volatile/non-volatile computer system storage mediums. Only as an example, the storage system 634 may be configured to read from and write to non-removable, non-volatile magnetic mediums (not illustrated in FIG. 7, and usually called "a hard disk driver"). Although not illustrated in FIG. 7, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 618 by one or more data medium interfaces. The system memory 628 may include at least one program product. The program product has a set of program modules (for example, at least one program module), and these program modules are configured to execute functions of respective embodiments of the present disclosure.

A program/utility tool 640, having a set (at least one) of program modules 642, may be stored, for example, in the system memory 628. Such program modules 642 include but not limited to an operating system, one or more application programs, other program modules, and program data. Each or any combination of these examples may include an implementation of a networking environment. The program module 642 usually executes functions and/or methods described in embodiments of the present disclosure.

The device 612 may communicate with one or more external devices 614 (such as a keyboard, a pointing device, and a display 624), may also communicate with one or more devices enabling a user to interact with the device 612, and/or may communicate with any device (such as a network card, and a modem) enabling the device 612 to communicate with one or more other computing devices. Such communication may occur via an input/output (I/O) interface 622. Moreover, the device 612 may further communicate with one or more networks (such as a local area network (LAN), a wide area network (WAN) and/or a public network, such as Internet) via a network adapter 620. As illustrated in FIG. 7, the network adapter 620 communicates with other modules of the device 612 via the bus 618. It should be understood that, although not illustrated in FIG. 7, other hardware and/or software modules may be used in combination with the device 612, including but not limited to: microcode, device drivers, redundant processing units, external disk drive arrays, RAID (redundant array of independent disks) systems, tape drives, and data backup storage systems, etc.

The processing unit 616, by operating programs stored in the system memory 628, executes various function applications and data processing, for example implements a method for transmitting a message according to any one of embodiments of the present disclosure. The method includes: sending a current message transmission packet to an output device based on current message data obtained from a message provider, in which, the current message transmission packet includes the current message data and transmission progress information; when a streaming transmission system is in a normal transmission state, obtaining an acknowledgement packet fed back after the output device sends the current message data to a message storage device; and sending the transmission progress information in the acknowledgement packet to a persistent storage system, such that the persistent storage system stores the transmission progress information as input progress information of the current message data.

It should be understood by the skilled in the art that, a processing unit may further implement a technical solution of a method for transmitting a message which is applied to an input device according to any one of embodiments of the present disclosure.

In addition, embodiments of the present disclosure further provide a device. The hardware structure and functions of the device may be explained with reference to the content of the device illustrated in FIG. 7 in the above embodiment. Meanwhile, the processing unit 616 may execute various functions and data processing by operating a program stored in the storage device 628, for example, implementing a method for transmitting a message which is applied to the output device according to any one of embodiments of the present disclosure. The method includes: when a streaming transmission system is in a normal transmission state, receiving a current message transmission packet, the current message transmission packet being sent by an input device based on current message data obtained from a message provider, in which the current message transmission packet includes the current message data and transmission progress information; and feeding back an acknowledgement packet to an input device after sending the current message to a message storage device, such that the input device sends the transmission progress information in the acknowledgement packet to a persistent storage system.

It should be understood by the skilled in the art that, the processing unit may further implement a technical solution of a method for transmitting a message which is applied to an output device according to any one of embodiments of the present disclosure.

Embodiments of the present disclosure further provide a computer readable medium having a computer program stored thereon. The method for transmitting the message according to any one of embodiments of the present disclosure is implemented when the computer program is executed by the processing unit, in which, the method is applied to an input device. The method includes: sending a current message transmission packet to an output device based on current message data obtained from a message provider, in which, the current message transmission packet includes the current message data and transmission progress information; when a streaming transmission system is in a normal transmission state, obtaining an acknowledgement packet fed back after the output device sends the current message data to a message storage device; and sending the transmission progress information in the acknowledgement packet to a persistent storage system, such that the persistent storage system stores the transmission progress information as input progress information of the current message data.

The computer readable storage medium according to embodiments of the present disclosure has a computer program stored thereon. The computer program may be not limited to the method described above, but may also perform related operations in the method for transmitting the message which is applied to the input device according to any one of embodiments of the present disclosure.

In addition, embodiments of the present disclosure further provide a computer readable medium having a computer program stored thereon. The method for transmitting a message according to any one of embodiments of the present disclosure is implemented when the computer program is executed by the processing unit, in which, the method is applied to an output device. The method includes: when a streaming transmission system is in a normal transmission state, receiving a current message transmission packet sent by an input device based on current message data obtained from a message provider, in which, the current message transmission packet includes the current message data and transmission progress information; and feeding back an acknowledgement packet to an input device after sending the current message data to a message storage device, such that the input device sends the transmission progress information in the acknowledgement packet to a persistent storage system.

The computer readable storage medium according to embodiments of the present disclosure has a computer program stored thereon. The computer program may be not limited to the method operation described above, but may also perform related operations in the method for transmitting the message which is applied to the output device according to any one of embodiments of the present disclosure.

The computer readable storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and also include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only optimal embodiments of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a specific illustration is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for transmitting a message, executable by an input device, and comprising:
    sending a current message transmission packet to an output device, the current message transmission packet comprising current message data and transmission progress information;
    obtaining an acknowledgement packet containing the transmission progress information from the output device;
    sending the transmission progress information in the acknowledgement packet to a persistent storage system, such that the persistent storage system stores the transmission progress information in the acknowledgement packet as input progress information of the current message data; and
    when detecting that the persistent storage system stores the input progress information of the current message data, generating a removing duplication instruction for the current message data, and sending the removing duplication instruction to the message provider, to indicate the message provider to delete the current message data.

2. The method of claim 1, further comprising:
    obtaining the current message data from a message provider; and
    generating the current message transmission packet based on the current message data.

3. The method of claim 2, wherein obtaining the current message data from the message provider comprises:
    obtaining the current message data from the message provider by a subscribing mode.

4. The method of claim 1, wherein the transmission progress information comprises a global system message-transmission progress and position information of the current message data in the message provider.

5. A method for transmitting a message, executable by an output device, and comprising:
    when a streaming transmission system is in a normal transmission state, receiving a current message transmission packet from an input device, the current message transmission packet comprising current message data and transmission progress information;
    sending output compress information of the current message data to the persistent storage system;
    feeding back an acknowledgement packet containing the transmission progress information to the input device after sending the current message data to a message storage device, such that the input device sends the transmission progress information in the acknowledgement packet to a persistent storage system;
    when the streaming transmission system is in an abnormal restarting state, after receiving any current message transmission packet sent by the input device, determining whether the persistent storage system stores output compress information of the current message data; and when the persistent storage system stores the output compress information of the current message data, feeding back the acknowledgement packet to the input device, such that the input device indicates the message provider to perform removing duplication on the current message data based on the acknowledgement packet for the current message data.

6. The method of claim 5, further comprising:

when the persistent storage system does not store the output compress information of the current message data, switching the streaming transmission system to the normal transmission state and performs message transmission operation.

7. The method of claim 5, wherein the transmission progress information comprises a global system message-transmission progress and position information of the current message data in the message provider.

8. A non-transient computer readable medium having a computer program stored thereon, wherein a method for transmitting a message is implemented when executed by the computer program, and the method comprises:

sending a current message transmission packet to an output device, the current message transmission packet comprising current message data and transmission progress information;

obtaining an acknowledgement packet containing the transmission progress information from the output device;

sending the transmission progress information in the acknowledgement packet to a persistent storage system, such that the persistent storage system stores the transmission progress information in the acknowledgement packet as input progress information of the current message data; and when detecting that the persistent storage system stores the input progress information of the current message data, generating a removing duplication instruction for the current message data, and sending the removing duplication instruction to the message provider, to indicate the message provider to delete the current message data.

9. The non-transient computer readable medium of claim 8, wherein the method further comprises:

obtaining the current message data from a message provider; and generating the current message transmission packet based on the current message data.

10. The non-transient computer readable medium of claim 9, wherein obtaining the current message data from the message provider comprises:

obtaining the current message data from the message provider by a subscribing mode.

11. The non-transient computer readable medium of claim 8, wherein the transmission progress information comprises a global system message-transmission progress and position information of the current message data in the message provider.

* * * * *